Figures 1, 2:
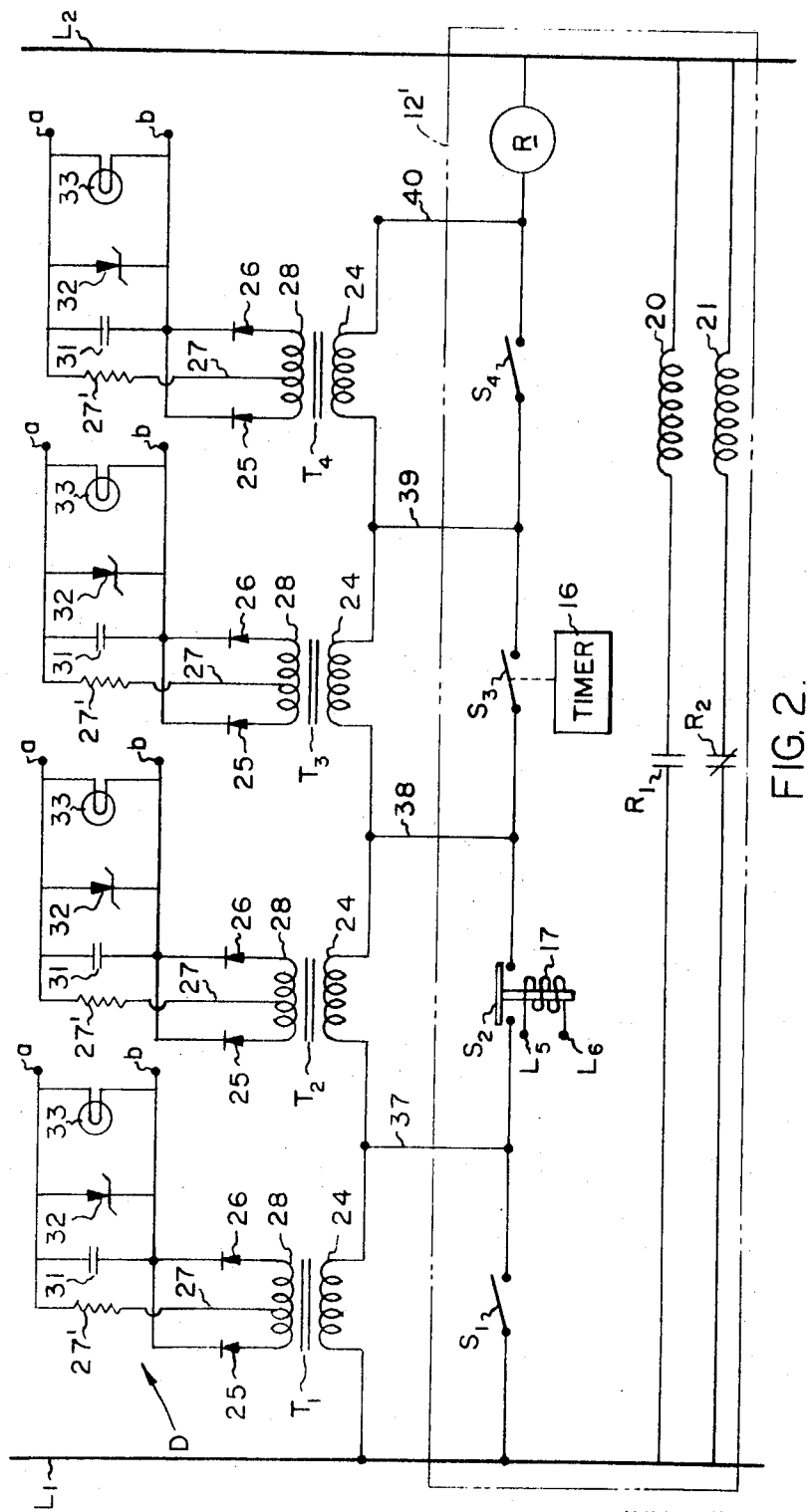

United States Patent [19]
Scourtes

[11] 3,727,205
[45] Apr. 10, 1973

[54] FAULT DETECTION APPARATUS

[75] Inventor: George Scourtes, Detroit, Mich.

[73] Assignee: Wilson Engineering, Inc., Saginaw, Mich.

[22] Filed: Dec. 17, 1969

[21] Appl. No.: 885,897

[52] U.S. Cl. ................340/256, 340/253 C, 340/415
[51] Int. Cl. .........................G08b 21/00, G08b 23/00
[58] Field of Search......................340/253, 213, 415, 340/256

[56] References Cited

UNITED STATES PATENTS

| | | | |
|---|---|---|---|
| 2,599,623 | 6/1952 | Forrester | 340/213 R X |
| 3,611,340 | 10/1971 | Harte et al. | 340/256 X |
| 3,505,664 | 4/1970 | Morris | 340/256 |
| 2,719,966 | 10/1955 | Schurr | 340/415 |

Primary Examiner—John W. Caldwell
Assistant Examiner—Daniel Myer
Attorney—Learman & McCulloch

[57] ABSTRACT

Fault detection apparatus for use with an electric control circuit for a machine tool or other instrumentality having a plurality of devices each of which must function in a predetermined manner to establish a predetermined circuit condition, the apparatus having means operable in response to faulty operation of any of such devices to indicate specifically which of such devices is faulty.

4 Claims, 2 Drawing Figures

PATENTED APR 10 1973 3,727,205

INVENTOR
GEORGE SCOURTES

BY
Learman & McCulloch

FAULT DETECTION APPARATUS

This invention relates to fault detection apparatus for an electric control circuit of a machine tool or the like, the circuit having a plurality of current or voltage regulating devices which must function in a predetermined manner to produce a desired circuit condition, and more particularly to apparatus for indicating the malfunction of any one of such devices.

In recent years, control systems for various types of machinery have been developed which are elaborate and extremely complex. Such systems commonly employ a multitude of switching and relay devices which are operated singly and in combination. When a fault occurs in one of the elements in such systems, much time is lost in attempting to isolate and identify the particular element which is malfunctioning. There are no known fault detection devices by means of which a particular one of a large number of elements has been rendered inoperative.

Detection apparatus of the type referred to herein may be employed in connection with one or more machine tools which have their own automatic control systems and do not require constant operator surveillance, but are monitored remotely by means of a computer to which signals are fed from the operating machine. When one or more of the elements in the machine's control system malfunctions, the fault detection apparatus according to the present invention provides a positive indication of the specific, malfunctioning elements.

According to the present invention, there is provided fault detection apparatus for use in detecting a fault in a control circuit which is adapted to be connected to a source of electrical energy for supplying an electrically operable device with a normal operating signal. Such a device may comprise a relay having a minimum threshold operating signal level and a normal operating signal level. When a fault occurs in the control circuit, the fault indicating means continues to provide a signal to the electrically operable device, but at a level below the minimum threshold level.

With the foregoing in view, the present invention consists of the combination and arrangement of parts, hereinafter more fully described, illustrated in the accompanying drawings and more particularly pointed out in the appended claims, it being understood that changes may be made in the form, size, proportion and details of construction without departing from the spirit or sacrificing any of the advantages of the invention.

In the drawings:

FIG. 1 is a block diagram illustrating a typical system which includes fault detection apparatus according to the invention; and FIG. 2 is an electrical diagram illustrating a typical fault detection circuit according to the invention.

A tooling machine which may be utilized to perform one or more operations on a work piece is shown at block 10 receiving control signals 11 from a control circuit designated generally by the block 12. Output signals from the control circuit 12 may be responsive to a plurality of conditions such as time, location of the workpiece, and the availability of power. If a malfunction occurs in one or more of the operating elements in the control circuit 12, a signal is provided at 14 to an electrically operable indicating means 15. Where, as is the usual case, a large number of elements are provided in the control circuit 12, a computer, which may comprise a commercially available digital computer, is shown at block 13 for monitoring the operability of the control circuit 12. The proper time-phase operating sequence of all elements in the machine tool control circuit is programmed into the computer memory. If the tooling machine 10 fails to operate properly, the computer 13 interrogates each element in the control circuit 12 and compares its operating condition with the programmed condition to rapidly provide an indication of which of the elements are malfunctioning.

FIG. 2 discloses a portion of the machine tool control circuit 12 in broken lines at 12' and includes a control device such as a relay R connected across power lines $L_1$ and $L_2$ through a plurality of switching devices $S_1$ and $S_4$. The lines $L_1$ and $L_2$ may be connected across a source of power such as 110 volt, 60 cycle alternating current. The devices $S_1 - S_4$ may comprise one or more limit switches such as those shown at $S_1$ and $S_4$, one or more relay operated switches such as that shown at $S_2$, one or more timer controlled switches suh as that shown at $S_3$, or any combination thereof. The relay operated switch $S_2$ is controlled by the coil 17 having terminals $L_5$ and $L_6$ connected with an energizing source of current, not shown. The timer for the switch $S_3$ is shown at 16. The control relay R may be of the type having a normal operating current, such as 100 milli-amperes, and a minimum threshold current, such as 60 milli-amperes, required to close its normally open contacts $R_1$ and open the normally closed contacts $R_2$ which are connected in series circuit with solenoids 20 and 21, respectively, across the lines $L_1$ and $L_2$. The solenoids 20 and 21 may be connected to control valves for pressure fluid cylinders (not shown), a chuck (not shown), or the work piece (not shown) to be machined to initiate or cease a particular operation of the machine tool. It will be understood that these examples are not exhaustive but merely illustrative of the operations which may be controlled by the relay R and the solenoids 20 and 21.

When the devices $S_1 - S_4$ are in their closed condition simultaneously, current will flow from line $L_1$ to line $L_2$ to energize the relay R with the normal operating current of 100 milli-amperes and thereby establish a predetermined circuit condition. Thus, the devices $S_1 - S_4$ control the supply of operating current to the relay R, and all of these devices must be closed to enable operating current to be delivered to the relay.

Fault detecting means D is associated with the control circuit 12 for detecting and indicating malfunctioning of any of the devices $S_1 - S_4$ and comprises a plurality of voltage step down transformers T, corresponding in number to the number of devices S, coupled to the associated device S. The transformers are connected in parallel with the devices $S_1 - S_4$ by means of conductors 37 – 40. The output of each transformer is converted to a DC signal by sets of diodes 25 and 26 wich are connected across each of the secondary windings 28, and a return wire 27 is connected to the midtap of each of the secondary windings through a limiting resistor 27'. The voltage is stepped down to provide a low level DC monitoring voltage which is limited to a specific value depending upon the particular value of a Zener diode 32 which is connected across the output of each secondary winding 28. A ripple filter capacitor 31 is connected across the diode 32 to provide a steady state DC voltage. An indicator, such as a lamp 33, is connected across each Zener diode 32 and is operable to glow in response to a signal across the secondary of the associated transformer. Aural signals may be used in lieu of lamps, if desired. Terminals $a$ and $b$ may be connected to the monitoring computer 13.

The construction and arrangement of the apparatus described thus far are such that, when all of the switch devices $S_1 - S_4$ are closed, the transformers T are shunted, normal operating current is supplied to the relay R to energize the latter, and the detecting apparatus is inactive. Should one or more of the devices $S_1 - S_4$ be open circuited, however, the transformer associated therewith will be energized, the associated indicating lamp 33 will be illuminated, an appropriate signal will be transmitted from the terminals $a$, $b$ to the computer, and the current supplied to the relay R will be less than that required to energize it.

In operation, the switching devices $S_1 - S_4$ will be moved to their closed position in any suitable manner so as to establish a circuit condition in which the relay R is connected across the lines $L_1$ and $L_2$. With the switch devices $S_1 - S_4$ in the closed position, the primary windings 24 of the transformers T will be shunted and no signal will be detected across the output of the transformer secondary windings 28. The lamps 33, therefore, will be dark. As the current to the relay R builds to the threshold value, such as 60 milli-amperes, the relay R is energized, thereby closing the normally open contacts $R_1$ to energize the solenoid 20 and opening the normally closed contacts $R_2$ to interrupt current flow to the solenoid 21. The valves or other devices controlled by such solenoids will operate in a predetermined manner.

Assuming that a fault occurs in one of the switch devices, such as an open circuit in the device $S_2$, current will flow from the line $L_1$ through the switch $S_1$, the conductor 37, the primary winding 24 of the transformer $T_2$, the conductor 38, the switches $S_3$ and $S_4$, and the relay R to the line $L_2$. The impedance of the primary windings 24 is so selected that when current flows through one of the primary windings, current will continue to be supplied to the relay R, but at a value less than the 60 milli-amperes necessary to maintain the relay energized. Consequently, the relay will be deenergized, thereby closing the contact $R_1$ and opening the contacts $R_2$. The voltage appearing across the primary winding 24 of the transformer $T_2$ will be stepped down through the secondary winding 28 and rectified through the diodes 25 and 26 connected thereacross and then delivered via the lamp 33 to the monitoring computer.

In the foregoing example, the lamp 33 associated with the switch $S_2$ will be the only illuminated lamp in the detector circuit. Indicia may be placed adjacent this lamp to indicate to the operator that it is the switch $S_2$ which is faulty. In this manner it is unnecessary that a continuity check of each individual element in the entire circuit be tested in order to determine which element or elements has or have been rendered inoperative. The bank of lamps 33 may be mounted on a control panel which is readily accessible to an operator.

If a plurality of the switch devices S is rendered inoperative, the lamps associated with the individual switches will glow. To illustrate, assume that the switch device $S_4$, as well as the switch $S_2$, is open circuited. Current will flow to the relay R through the switch $S_1$, the line 37, the primary winding 24 of the transformer $T_2$, the line 38, the switch $S_3$, the conductor 39, the primary winding 24 of the transformer $T_4$, and the conductor 40. Thus, the indicator lamps 33 associated with the transformers $T_2$ and $T_4$ will light simultaneously, thereby indicating to the operator that two devices $S_2$ and $S_4$ are faulty. The current through the relay R will again be insufficient to maintain the latter energized.

The circuit will also operate to detect and indicate a short-circuit in one of the switches $S_1$ and $S_4$. If, for example, the switches $S_2 - S_4$ are in the closed position and the switch $S_1$ is in the open position for proper circuit operation, the lamp 33 associated with the switch $S_1$ will illuminate and a signal, i.e., 5 volts, will be detected across the terminals $a$ and $b$. To determine proper circuit operation, the operator may visually check the lamp and compare its time of illumination with a time phase sequence chart at the disposal of the operator or the 5 volt signal at terminals $a$ and $b$ may be detected by the computer 13, and compared with the stored information in the computer memory as to the proper voltage for this particular time. If the switch $S_1$ should short-circuit, the lamp 33 associated therewith would fail to operate, thus providing an indication that the switch $S_1$ is inoperative. There would be no signal across the terminals $a$ and $b$ at this time, thus, the computer 13 would detect and compare the absence of the signal with the stored information as to the proper signal and provide an indication of the malfunction in the normal manner.

The disclosed embodiment is representative of the presently preferred form of the invention, but is intended to be illustrative rather than definitive thereof.

I claim:

1. Fault detection and monitoring apparatus for use with an electric circuit which controls the operation of an instrumentality and includes a plurality of electrically operable devices which are operable in electrical current conducting and non-conducting conditions and must operate in a predetermined manner to establish a predetermined circuit condition, said devices being adapted to be connected with a source of electric alternating current power, said apparatus comprising:

electrically operable detecting means for detecting the condition of said devices including an input circuit coupled to each of said devices and said source of electric power and an output circuit providing a continuous electrical output signal when any one of said devices is in said non-conducting condition; and monitoring means responsive to the continuous electrical output signal of said detecting means for comparing the value of said continuous signal with a predetermined value and indicating whether said devices are operating in said predetermined manner;

said detecting means comprising:

transformer means, having primary winding means and secondary winding means for coupling said electrically operable devices and said source of power to said monitoring means, said primary winding means being adapted to be connected to said source of power and connected in parallel circuit relation with said devices; and rectifier circuit means connected to said secondary winding means to rectify the signal coupled to said secondary winding means and provide said continuous signal;

said monitoring means being connected to said rectifier circuit means to be energized by said continuous signal.

2. Fault indicating apparatus as set forth in claim 1 including an electric circuit element connected in circuit with said electrically operable devices; said element being operable in response to a minimum threshold current level, said coupling means being operable to provide continuous, limited current from said source to said element below said threshold level when a malfunction occurs to open circuit any one of said electrically operable devices.

3. Fault detection and monitoring apparatus as set forth in claim 1 including means connected to said rectifier circuit means for limiting the value of said continuous signal.

4. Fault detection and monitoring apparatus as set forth in claim 1 including means connected to said rectifier circuit means for limiting said continuous signal to a predetermined value.

* * * * *